Patented Dec. 25, 1934

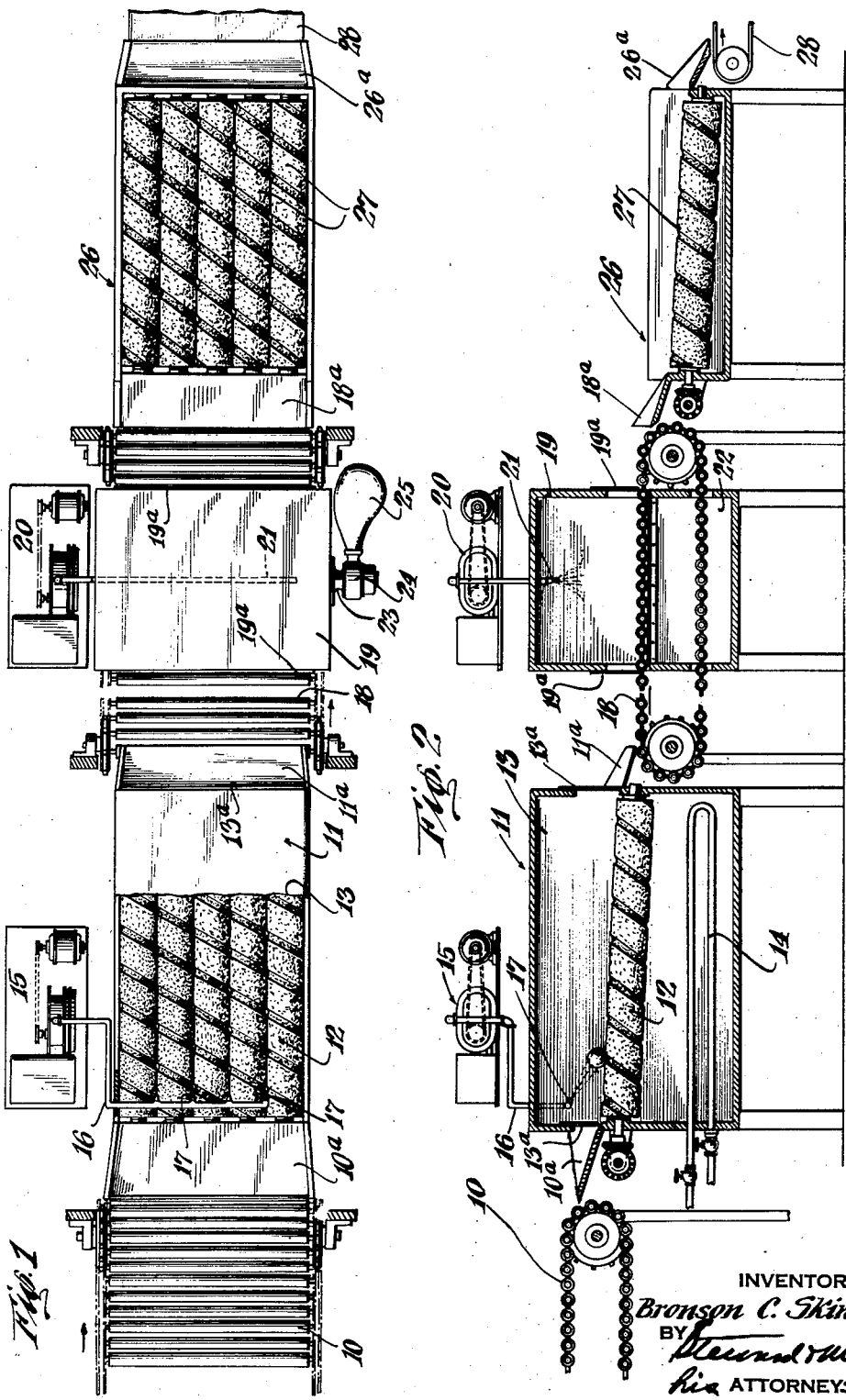

1,985,842

UNITED STATES PATENT OFFICE 1,985,842

TREATMENT OF FRESH FRUIT IN PREPARATION FOR MARKET

Bronson Cushing Skinner, Dunedin, Fla., assignor to Brogdex Company, Winter Haven, Fla., a corporation of Florida Application October 13, 1932, Serial No. 637,651

7 Claims. (Cl. 91—68)

This invention relates to treatment of fresh fruit in preparation for market; and it relates more particularly to a process of protectively coating fruit, wherein fruit is initially provided with a thin, film-like coating of suitable protective material that is relatively soft but solid at ordinary temperatures and satisfactorily adherent to the fruit surface, after which material that is harder and higher-melting is brought into contact with the initially coated fruit surface in finely powdered solid condition and in the form of a cloud or air-suspension resulting from atomizing the harder surfacing material while molten into air maintained at a temperature substantially below the melting point thereof, said material being of such character that when spread over the previously coated surface of the fruit under proper conditions it unites with the initial coating to provide a complete finished surface coating having valuable characteristics for protecting the fruit and for imparting thereto a relatively high and permanent surface luster or polish which materially enhances its marketability.

The process of the invention is more particularly adapted for surface-treating citrus fruits such as oranges and grapefruit, but it may also be applied under proper operating conditions to deciduous fruits such as apples, pears or the like or, in general, to any fresh fruit or vegetable more or less globular in shape and susceptible of having a coating of the character in question applied to it. Unless otherwise indicated the term fresh fruit as employed herein is to be understood generically as including all such fruits and vegetables.

One of the principal objects of the invention is to provide fresh fruit undergoing preparation for market with a protective coating definitely and satisfactorily accomplishing simultaneously two important results, both of which are much desired by the trade but which it has been extremely difficult to attain heretofore in combination. The first of these desired results is the material retardation of the rate at which citrus and other fresh fruits normally wither or shrivel upon exposure to air under shipping and marketing conditions, thus maintaining the fruit plump but without so completely sealing its surface as unduly to interfere with its "breathing" or transpiration so essential to its continued well being. The second desired result is the imparting to the fruit surface of a high polish or shine, something which is insisted upon by the trade and the lack of which, regardless of how plump and fair the fruit may be, is commonly seized upon by fruit dealers to force substantial price concessions when the fruit arrives at wholesale marketing points, with consequent losses to growers and shippers.

While remarkable progress has been made during the last decade in the development of methods for retarding withering of fresh fruit and keeping it plump and sound from the tree to the consumer, the problem of how to do this and at the same time to meet the insistent demand for a good shine or polish on the fruit has been a troublesome one for which, notwithstanding the large amount of laborious and expensive research that has been put upon it, no thoroughly satisfactory and commercially feasible solution has been available heretofore. This has been due primarily to the fact that materials best suited to provide a dependable wilt-retarding coating having the requisite firm adherence to the fruit surface and other necessary characteristics for that purpose are not well adapted to impart high shine or luster; while materials capable of meeting the latter requirement do not in and of themselves form satisfactory wilt-retarding coatings because, for example, they do not adhere firmly enough to the fruit surface when applied thereto but tend to crack and flake off, or because they are so dense and impermeable that they tend to seal the fruit surface too completely upon application thereto. Also the necessity for keeping the cost of any treatment of fresh fruit down to a very low figure in view of the usually small margin of profit to the grower has added to the difficulty of solving the problem in a commercially feasible manner.

The present invention solves this long-standing problem in an effective and economical manner. The new process comprises first providing the fruit with a very thin coating of solid protective material that adheres tenaciously to the fruit surface and partially seals it, then contacting the initially coated fruit with a cloud or air suspension of minute solid particles of a harder and higher-melting coating material capable of imparting good shine or luster, and rubbing the fruit vigorously; the cloud or air suspension being produced by atomizing or nebulizing the harder coating material from a molten condition into air whose temperature is substantially below the melting point of the coating material.

The coating materials employed in practicing the present process may be of various specific kinds. That used for the initial coating must be compatible with the fruit surface and capable upon suitable direct application thereto, of forming a substantially continuous and firmly adherent, thin, film-like envelope which partially but not completely seals the fruit surface. Waxy materials that are solid but not very hard or brittle at ordinary atmospheric temperature (e. g. 70° F.) are suitable, generally speaking. Paraffin wax, which commonly melts at around 125° F., is excellent material for the initial coating. Other waxes or wax-like substances, especially those generally resembling paraffin wax in their physical characteristics, are suitable. Mixtures of one or more such relatively soft waxes with a small proportion of a harder wax like carnauba, may also be used. Animal or vegetable oils that have been hydrogenated to the proper wax-like consistency can sometimes be used to advantage although they are usually not as effective as paraffin. For the purposes of the invention, the various coating materials above mentioned by way of typical examples may be generically classed as wax-like in character. But all relatively soft coating materials such as the foregoing, although adhering well directly to the surface of fruit and capable in varying degree of providing a protective coating for fresh fruit effective to reduce or retard withering or wilting, are incapable of giving the high surface luster or shine which modern marketing conditions demand. The material employed for the second or superimposed coating is characterized by substantial luster-imparting properties and, generally speaking, is harder, more brittle and higher-melting than the material of the initial or underlying coating. It may consist wholly or chiefly of a relatively hard, high-melting wax, for example. Carnauba wax, good commercial grades of which usually melt at around 184° F., is an especially good material for the second coating. While carnauba wax adheres but indifferently well to the surface of fruit when applied directly thereto, exhibiting considerable tendency to crack and flake off, it adheres tenaciously to the underlying coating of softer material initially applied in accordance with the principles of the invention, and upon subsequent rubbing develops a fine and permanent luster, in strong contrast to the comparatively dull appearance often characterizing fruit coated by former methods. Other relatively hard waxes or, generically, wax-like materials may be used in place of or in conjunction with carnauba for the second coating; also hard gums, natural or synthetic, capable of being applied as herein described and possessing luster-imparting properties.

The present process therefore comprises essentially the application to fresh fruit, following a preceding initial step of coating with softer solid material, of harder coating material characterized especially by its ability to impart a good permanent luster or polish to the fruit, wherein such harder material is brought into contact with the previously coated fruit in extremely finely divided, dust-like, solid condition, that is, in the form of an impalpably fine powder. Moreover, in order that the presentation of the material to all portions of the surface of the fruit may be as nearly uniform as possible, the process includes effecting pulverization and air-suspension of said coating material just before its application and contact with the fruit, thereby preventing its clumping together as it would otherwise do to a greater or less extent by reason of its somewhat adhesive character if it were allowed to remain in a mass for some time after pulverization. The aforesaid pulverization of the coating material almost simultaneously with its application to the fruit is best effected in practice by atomizing or nebulizing the coating material, from a supply thereof in molten form, into a chamber through which the fruit is passing and in which the prevailing temperature is substantially below the melting point of said material, and in practice may approximate that of the outside atmosphere. Under these circumstances, the extremely minute particles of the nebulized molten coating material immediately solidify upon contact with the relatively cool air and, by reason of their extreme fineness, form a cloud or air-suspension in the chamber with which the surface of the previously coated friut is uniformly bathed. The extremely minute solid particles of coating material coming into contact with the initial coating on the fruit adhere thereto at all points, the fruit therefore carrying off with it a minute quantity of the solid coating material deposited practically uniformly over its entire outer surface. Subsequent or simultaneous rubbing of the fruit on rapidly revolving brushes or the like, which may desirably also be effected at ordinary atmospheric temperature, partially embeds these uniformly deposited minute solid particles of relatively hard coating material in the underlying softer coating as in a matrix, while also smoothing and spreading them out into a practically continuous outer film of extremely minute thickness firmly adherent to and united with the underlying softer material, and by the burnishing action of the brushes a relatively high final luster or gloss on the fruit is thus ensured.

By nebulizing the molten hard coating material into relatively cool air as described, reduction of that material to almost impalpably fine dust-like powder of substantially uniform character, which is essential for the purposes of the invention, is accomplished with far greater ease, perfection and economy than would be possible by mechanical grinding.

In the most desirable practical embodiments of the invention, the initial thin film coating of relatively soft non-brittle coating material of suitably adherent and protective character, such as paraffin wax or a waxy composition containing paraffin in predominating proportion, is applied by atomizing molten material of such character into direct contact with the surface of fruit in an environment maintained at a temperature substantially above the melting point of the waxy material in question. The fruit is also thoroughly rubbed by rapidly revolving brushes or the like in this same or a similar relatively high temperature environment, whereby the coating material in substantially molten or fluid condition is spread by the frictional action of the brushes uniformly over the entire surface of the fruit and is worked into every surface pore or other irregularity on the outer surface of the rind, ensuring most intimate contact of the resultant continuous film coating with the rind at every exposed point, with resultant firm and tenacious adherence of the film as a whole to the outer surface of the fruit. In the next stage of the process, the second extremely thin film coating consisting wholly or chiefly of harder and more brittle and higher melting coating material, such as carnauba wax, which is nevertheless compatible with the softer material and capable of firm adherence thereto, is applied in the manner already referred to hereinabove, namely, by contacting the fruit in a relatively cool environment with a cloud or air-suspension of minute solid particles of such harder and more brittle coating material produced by atomization or nebulization of said material substantially in situ. Simultaneously or subsequently the fruit is subjected to vigorous rubbing by revolving brushes or the like. The resultant blending or consolidation of the dust-like particles of said harder material more or less into what amounts to a final outer film-like coating, in addition to augmenting the protection against wilting and shriveling, also ensures production of a high polish or shine which persists throughout the marketable life of the fruit. The initially applied softer material serves as connecting or linking means whereby the harder and more brittle high luster coating is firmly anchored to the surface of the fruit although it is not in direct contact therewith.

It is important for best results that, in applying the second or outer film coating of harder material, said material be in solid as opposed to molten condition when it is brought into contact with the fruit initially coated with softer material, and that the rubbing be effected in a relatively cool environment, that is, at a temperature below the melting point of both materials. In this way the harder material may be superimposed upon the softer as a fairly distinct thin outer layer firmly united therewith. Application of the harder material in molten condition and/or effecting the rubbing with the aid of substantial heat would result in much greater intermingling of the materials with consequent reduction both in the degree and permanency of the luster or polish obtained and also to some extent in the tenacity with which the combined coating as a whole adheres to the fruit. Although not indispensable to success, it is desirable in practice that the fruit come into contact with the cloud or air-suspension of solid particles of the harder coating material rather soon after application of the initial coating of softer material, where the softer material is applied with the aid of heat, although not before the initial coating has become set or solid. Where the time interval is short, however, the initial coating still exhibits to a greater degree than later a slight tackiness or stickiness which promotes rapid and abundant adherence thereto of the minute solid particles of harder material brought into contact therewith in the second step or stage of the process, besides further ensuring solid and tenacious anchorage of the final outer film coating to the underlying softer film coating. But even though application of the harder material be long delayed, the surface presented by the softer material of the initial coating is such that enough particles of harder material adhere thereto from the surrounding air-suspension to give a materially enhanced luster to the finished coating obtained by brushing.

While it is desirable, as stated, that the initial coating of softer material be applied with the aid of heat and vigorous rubbing or brushing, this is not indispensable within the scope of the present invention. A relatively soft coating material like paraffin can be applied to the surface of fruit by application of a solution of paraffin, with or without rubbing, or by rubbing solid paraffin on the fruit surface, either of such operations being conducted with or without the aid of heat. While such methods are considered to be less satisfactory than the method of applying the initial coating hereinabove described, it is possible to use such alternative methods of applying the initial coating with fair measure of success, and then to superimpose a final film coating of harder and more brittle coating material by the air suspension procedure hereinabove described. Whatever method of applying the initial coating be employed, the surface presented by the softer material thereof herein contemplated always enables the dust-like particles of the subsequently applied harder and more brittle material to adhere thereto in sufficient quantity and with sufficient tenacity to provide a final outer coating having enhanced luster or shine.

While the practice of the process is not confined to any specific form of apparatus for carrying it out, apparatus especially suitable for the purpose is shown by way of example in the accompanying drawing wherein Figs. 1 and 2 illustrate the apparatus in plan and in side elevation, respectively, certain parts being shown broken away and in section to disclose certain details of construction.

In using the illustrated apparatus for practicing the process in one of its most desirable embodiments, fruit, which usually has gone through the customary washing and surface-drying operations unnecessary to describe here, is conveyed by roller belt conveyor 10 of well-known type to an apparatus unit indicated generally at 11 wherein the fruit is provided with the aforesaid initial film coating of relatively soft coating material. In the present instance, it may be assumed that this material is ordinary paraffin wax of good commercial grade, having a melting point usually approximating 125° F. or thereabouts. The apparatus unit 11 comprises a plurality of cylindrical brush rolls 12 rotatably mounted side by side in parallel to provide between the members of each pair of adjacent brush rolls an elongated fruit runway extending lengthwise of the unit. The brush rolls are rotated by driving means as shown. This general type of apparatus is well known in the citrus fruit packing industry especially, the construction thus far described being a more or less conventional type of polisher in common use.

The polisher rolls are enclosed in a housing 13 providing a chamber in the lower part of which, below the brush rolls, are suitable heating means 14, such as steam coils, by which the temperature within the chamber may be maintained substantially above the melting point of the initial coating material, say at 140°–150° F. or somewhat warmer. At 15 is indicated generally a wax-atomizing or nebulizing unit discharging through pipe 16 and one or more atomizing nozzles 17 into the interior of the housing 13 at a location near the upper or intake ends of the polisher brush rolls 12 which, as indicated, may slope downward slightly toward the opposite or discharge end of the polisher unit. The housing 13 has openings each provided with a flexible flap closure 13ª through which fruit may pass to and from the brush roll unit. The atomizing unit 15 may be of any suitable type, one particularly desirable type being that disclosed in this applicant's prior Patent No. 1,830,297 of November 3, 1931 which, however, is referred to here merely by way of a typical example.

Fruit delivered to the unit 11 over delivery or chute board 10ª by conveyor 10 receives a small quantity of molten paraffin sprayed upon it through spray nozzles 17, and then continues to travel down the long runways between brushes 12, still in an atmosphere maintained at around 140°–150° F. or higher, meanwhile being continuously subjected to vigorous rubbing by the rapidly rotating brush rolls of horsehair or the like. The fruit should remain under these conditions for a long enough time to ensure thorough and uniform spreading of the coating material over its entire surface in a thin film. Ordinarily a stay of from ten or fifteen to twenty-five seconds in unit 11 suffices to produce a coating of the desired character. The duration of the treatment in unit 11 can of course be determined and controlled by using brush rolls of the requisite length and inclination, and by adjusting the speed of operation as may be desired.

The fruit provided with its initial film coating of paraffin and discharged from unit 11 over chute board 11a is received by another roller conveyor 18 and is thereupon exposed to ordinary atmospheric temperature, with the result that the paraffin coating almost instantly sets or becomes solid, although for a short time it remains noticeably slightly tacky or sticky. Although this perceptible tackiness soon disappears, a coating of relatively soft material like paraffin wax practically never attains such a degree of hardness that fine dust-like particles which come in contact with it will not adhere thereto in perceptible quantity.

The fruit is carried by conveyor 18 into a chamber enclosed by hood or housing 19 mounted just above the conveyor and extending across its entire width. This hood has entrance and exit openings guarded by flexible flap closures 19a, but is not provided with heating means. In this unheated hood, the fruit encounters a cloud or air-suspension of minute dust-like particles of harder and more brittle coating material which, in the present instance, may be assumed to be carnauba wax of good commercial grade, having a melting point of, say, about 182°–184° F. This cloud or air-suspension of minute solid hard wax particles is produced and maintained by means of an atomizing or nebulizing unit 20, which may be similar in all respects to unit 15 already described. The molten carnauba wax atomized or nebulized into the upper part of the hood 19 through suitable nozzle means 21, upon encountering the substantially ordinary atmospheric temperature conditions maintained in hood 19, instantly solidifies in the form of solid dust-like particles of flour-like fineness to provide the cloud or air-suspension referred to, which passes downwardly and bathes every portion of the surface of the fruit moving through the chamber. A small quantity of the solid carnauba wax in this condition thus contacts with and promptly adheres to all points on the outer surface of the paraffin-coated fruit, as the roller belt conveyor carries the fruit through the chamber and slowly turns it over and over to expose it fully to the wax dust suspension. In order to avoid substantial escape of carnauba wax dust from the hood 19 into the surrounding air and consequent annoyance to operators, as well as to provide means for positively directing flow of the suspended wax particles into contact with the fruit passing through the hood, the hood has a lower portion or extension 22 arranged below the conveyor 18, communicating through conduit 23 with a suction fan or blower 24 arranged to suck excess wax dust away from below the conveyor and discharge it into suitable separating means, such as cloth bag 25, which separates the dust from accompanying air. The dust is retained in the bag and can be remelted and again nebulized into chamber 19, if desired. The suction fan also serves continuously to draw cool air into the hood 19 from outside, thereby assisting in keeping the enclosed chamber cool enough to ensure prompt solidification of the molten carnauba wax particles notwithstanding the heat being constantly introduced therewith into the chamber. In this connection, reference to the temperature in the hood or chamber 19 as relatively cool or as substantially atmospheric is not to be construed as excluding a temperature in the chamber somewhat above that of the outside atmosphere.

After having passed through housing 19, the fruit carrying adhering solid particles of carnauba wax all over its surface is delivered by conveyor 18 over chute board 18a to a second polisher unit 26 having brush rolls 27 similar in construction and arrangement to polisher brush rolls 12 of unit 11. The polisher unit 26 is not heated, however, and the fruit passing therethrough is exposed to ordinary atmospheric temperature. In this unit, the fruit is subjected to vigorous rubbing by the brush rolls 27 for a suitable period of time, say from ten or fifteen to twenty-five seconds. These rolls may advantageously be driven at relatively high speed in order to give an actual buffing effect and thus produce a particularly good polish or shine on the fruit. For instance, with brush rolls having a diameter of 7½ inches, it is practical to operate at approximately 400 R. P. M., giving a brush surface speed of about 800 feet per minute. A speed of this order of magnitude is very effective for the purpose.

The fruit leaving unit 26 over delivery or chute board 26a is in finished condition, and may be received and carried away by conveyor belt 28 to undergo the final operations of grading, sizing and packing into suitable containers for shipment to market.

It is to be understood that the complete finished film coating produced in two stages in accordance with the invention is in no case sufficiently thick or dense to prevent or unduly interfere with the so-called breathing or transpiration of the fruit, continuance of which is essential to the well-being and marketability of the fruit.

What is claimed is:

1. In the preparation of fresh fruit for market, the process which comprises initially applying to fresh fruit a continuous thin film coating of shrinkage-retarding, wax-like material non-injurious thereto, which is solid but relatively soft at ordinary atmospheric temperature, is compatible with the fruit surface and adheres well directly thereto, then atomizing molten coating material, selected from the group consisting of wax-like materials and gums, which is harder and higher melting than the material initially applied but is compatible with and capable of adhering thereto, into operative proximity with the initially coated fruit in an environment which is at a temperature below the melting point of either coating material, whereby said fruit with its initial coating is bathed in a cloud or air-suspension of very fine particles of said harder coating material in solid condition and becomes coated with a small quantity thereof, and finally rubbing the fruit until it has a good luster or polish, the finished film coating, although effective to retard material shrinkage or withering of the fruit, being insufficiently thick to seal the surface of the fruit so completely as to interfere unduly with transpiration.

2. The process defined in claim 1, wherein the coating initially applied consists principally of paraffin-like waxy material, while that subsequently applied consists principally of harder and higher melting waxy material resembling carnauba wax in respect to hardness.

3. In the preparation of fresh fruit for market, the process which comprises rubbing fresh fruit with coating material consisting chiefly of paraffin wax in a heated environment to provide the fruit with a thin film-like protective coating which adheres well to the fruit surface, removing the fruit from said heated environment into a relatively cool environment and there contacting it, while its surface is still slightly tacky, with an air-suspension of minute solid particles of carnauba wax produced by atomizing molten carnauba wax into such latter environment, and rubbing the fruit at ordinary temperature until it has a good luster or polish.

4. In the preparation of fresh fruit for market, the process which comprises initially coating fruit with an adherent continuous film coating of relatively soft shrinkage-retarding, wax-like material non-injurious thereto and compatible with the surface thereof, then passing the fruit through an enclosed space while atomizing thereinto molten waxy material which is harder and whose melting point is substantially above ordinary atmospheric temperature but which is compatible with and capable of adhering to the material initially applied, cooling said chamber to maintain the temperature therein substantially below said melting point whereby the atomized waxy material instantly congeals to provide a cloud or air-suspension of minute solid particles bathing said fruit and in part depositing thereon, and rubbing the fruit to distribute the deposited waxy material uniformly thereover, the finished film coating, although effective to retard material shrinkage or withering of the fruit, being insufficiently thick to seal the surface of the fruit so completely as to interfere unduly with transpiration.

5. The process defined in claim 4, wherein the harder coating material employed is carnauba wax.

6. In the preparation of fresh fruit for market, the process which comprises initially providing fresh fruit with an adherent protective continuous film coating of suitable protective wax-like material non-injurious thereto and compatible with the surface thereof, adequate to retard withering and presenting for some time after its formation a perceptibly tacky surface, nebulizing suitable non-injurious molten coating material, selected from the group consisting of wax-like materials and gums, which is harder and higher melting than the initially applied material, but which is compatible therewith and capable of adhering thereto, into proximity with the initially coated fruit while its surface is still tacky but under cooling conditions such that the fine dust-like particles of harder coating material solidify before contacting the coated fruit, and then rubbing the fruit to distribute the dust-like deposit of harder coating material uniformly thereover and provide a smooth finished surface, the finished film coating, although effective to retard material shrinkage or withering of the fruit, being insufficiently thick to seal the surface of the fruit so completely as to interfere unduly with transpiration.

7. In the preparation of fresh fruit for market, the process which comprises initially providing fresh fruit with an adherent continuous protective coating of relatively soft solid shrinkage-retarding material of wax-like character and compatible with the surface thereof, producing an air-suspension of fine particles of a harder coating material also of wax-like character, compatible with the initially applied material and capable of adhering thereto, by atomizing said harder coating material in molten condition into air which is at a temperature below the melting point of said material, directing flow of such air-suspension into contact with the initially coated fruit to obtain a deposit of said particles thereon, and rubbing the fruit to finish the coating, the finished film coating, although effective to retard material shrinkage or withering of the fruit, being insufficiently thick to seal the surface of the fruit so completely as to interfere unduly with transpiration.

BRONSON CUSHING SKINNER.